United States Patent
Fukuda et al.

(10) Patent No.: US 10,788,330 B2
(45) Date of Patent: Sep. 29, 2020

(54) ROUTE GENERATION BASED ON AGGREGATED PATH DATA

(71) Applicant: International Business Machines Corporation, Armonk, NY (US)

(72) Inventors: Mari Fukuda, Tokyo (JP); Satoshi Hosokawa, Chiba (JP); Yasutaka Nishimura, Kanagawa-ken (JP); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 15/397,870

(22) Filed: Jan. 4, 2017

(65) Prior Publication Data
US 2018/0188053 A1 Jul. 5, 2018

(51) Int. Cl.
*G01C 21/34* (2006.01)
*G08G 1/0969* (2006.01)
(Continued)

(52) U.S. Cl.
CPC ....... *G01C 21/3484* (2013.01); *G08G 1/0112* (2013.01); *G08G 1/0129* (2013.01); *G08G 1/0145* (2013.01); *G08G 1/0969* (2013.01); *G08G 1/096816* (2013.01); *G08G 1/096827* (2013.01); *G08G 1/096838* (2013.01);
(Continued)

(58) Field of Classification Search
CPC .. G01C 21/3484; H04W 4/025; H04W 4/024; H04L 67/22; H04L 67/306; H04L 67/12; G08G 1/096816; G08G 1/0129; G08G 1/096827; G08G 1/0112; G08G 1/0145; G08G 1/0969; G08G 1/096838
See application file for complete search history.

(56) References Cited

U.S. PATENT DOCUMENTS 7,610,151 B2 10/2009 Letchner et al.
8,768,625 B2 7/2014 Kritt et al.
(Continued)

FOREIGN PATENT DOCUMENTS

WO 2014002209 1/2014

OTHER PUBLICATIONS

"Getting Started with Driver Behavior Analysis", https://github.com/IBM-Bluemix/docs/blob/master/services/IotDriverInsights/drb_index.md, IBM, 2017, 4 pages.
(Continued)

*Primary Examiner* — Nadeem Odeh
*Assistant Examiner* — Michael V Kerrigan
(74) *Attorney, Agent, or Firm* — Robert Bunker; Edell, Shapiro & Finnan, LLC

(57) ABSTRACT

Generating routes based on aggregated path data includes accumulating trajectory data from a plurality of users, wherein data entries in the trajectory data each include an origin and a destination. When a request for a route from a designated location to a particular destination is received from a particular user, one or more of the data entries are identified as relevant to the request for the route when the origin of a particular data entry is similar to the designated location and the destination of the particular data entry is similar to the particular destination. Route recommendations are generated for the particular user based on one or more data entries identified as relevant.

17 Claims, 7 Drawing Sheets

(51) Int. Cl.
    *G08G 1/0968* (2006.01)
    *G08G 1/01* (2006.01)
    *H04W 4/02* (2018.01)
    *H04L 29/08* (2006.01)
    *H04W 4/024* (2018.01)

(52) U.S. Cl.
    CPC ............ *H04L 67/22* (2013.01); *H04W 4/024* (2018.02); *H04W 4/025* (2013.01); *H04L 67/12* (2013.01); *H04L 67/306* (2013.01)

(56) References Cited

U.S. PATENT DOCUMENTS

| | | | |
|---|---|---|---|
| 9,366,542 B2 | 6/2016 | Singh | |
| 2009/0006994 A1* | 1/2009 | Forstall | G01C 21/20 715/764 |
| 2010/0211304 A1 | 8/2010 | Hwang et al. | |
| 2014/0310366 A1* | 10/2014 | Fu | H04L 51/04 709/206 |
| 2014/0372030 A1 | 12/2014 | Leader et al. | |
| 2015/0079932 A1* | 3/2015 | Zelinka | H04W 4/029 455/411 |
| 2015/0177009 A1* | 6/2015 | Saito | B60L 3/00 701/424 |
| 2015/0345977 A1* | 12/2015 | Saito | B60L 3/00 701/521 |

OTHER PUBLICATIONS

"Getting Started with Trajectory Pattern Analysis", https://github.com/IBM-Bluemix/docs/blob/master/services/IotDriverInsights/tp_index.md, IBM, 2017, 4 pages.

\* cited by examiner

| od_pattern_id | route_pattern_id | gps_list |
|---|---|---|
| 1 | 1_1 | (x1_1-1,y1_1-1),(x1_1-2,y1_1-2),(x1_1-3,y1_1-3),(x1_1-4,y1_1-4),(x1_1-5,y1_1-5),(x1_1-6,y1_1-6),(x1_1-7,y1_1-7),(x1_1-8,y1_1-8),(x1_1-9,y1_1-9),(x1_1-10,y1_1-10) |
| 2 | 2_1 | (x2_1-1,y2_1-1),(x2_1-2,y2_1-2),(x2_1-3,y2_1-3),(x2_1-4,y2_1-4),(x2_1-5,y2_1-5),(x2_1-6,y2_1-6),(x2_1-7,y2_1-7),(x2_1-8,y2_1-8),(x2_1-9,y2_1-9),(x2_1-10,y2_1-10) |
| 3 | 3_1 | (x3_1-1,y3_1-1),(x3_1-2,y3_1-2),(x3_1-3,y3_1-3),(x3_1-4,y3_1-4),(x3_1-5,y3_1-5),(x3_1-6,y3_1-6),(x3_1-7,y3_1-7),(x3_1-8,y3_1-8),(x3_1-9,y3_1-9),(x3_1-10,y3_1-10) |
| 3 | 3_2 | (x3_2-1,y3_2-1),(x3_2-2,y3_2-2),(x3_2-3,y3_2-3),(x3_2-4,y3_2-4),(x3_2-5,y3_2-5),(x3_2-6,y3_2-6),(x3_2-7,y3_2-7),(x3_2-8,y3_2-8),(x3_2-9,y3_2-9),(x3_2-10,y3_2-10) |
| ... | ... | ... |

FIG.7

ROUTE GENERATION BASED ON AGGREGATED PATH DATA

BACKGROUND

Present invention embodiments relate to navigation systems, and more specifically, to route generation for navigation systems based on aggregated path data.

As the Internet of Things (IoT) expands to include all sorts of devices, such as kitchen appliances, fitness trackers, alarm clocks, thermostats, vehicles, etc., an immense amount of data is being generated. For vehicles in particular, multiple device types facilitate the generation of large amounts of telematics data that allow vehicles to be tracked over different routes or paths. Currently, this data is being used to help track and resolve traffic issues. For instance, navigation routes based on driver preferences (e.g., shortest route or shortest time, minimize or maximize highway driving, etc.) can be improved and/or adjusted based on detected traffic or known traffic patterns.

However, in some instances a driver may prefer particular routes that take the driver past or towards a place of interest (e.g., a grocery store or laundromat), especially when a primary route (e.g., a highway route) is congested with traffic or otherwise undesirable. Additionally or alternatively, a driver may want to traverse a path or visit a places of interest that is frequently visited by other drivers (e.g., a popular restaurant in an area that is unfamiliar to the diver). Unfortunately, typically, generated routes and/or route adjustments fail to consider these factors.

SUMMARY

According to one embodiment of the present invention, generating routes based on aggregated path data includes accumulating trajectory data from a plurality of users, wherein data entries in the trajectory data each include an origin and a destination. When a request for a route from a designated location to a particular destination is received from a particular user, one or more of the data entries are identified as relevant to the request for the route when the origin of a particular data entry is similar to the designated location and the destination of the particular data entry is similar to the particular destination. Route recommendations are generated for the particular user based on one or more data entries identified as relevant. Generating routes in this manner may provide users (e.g., drivers) with route recommendations that are frequently traversed by other users and, thus, likely to be beneficial routes (e.g., beneficial for easy driving or visiting a place of interest (POI)). For example, routes generated based on accumulated path data for a plurality of users may lead a user or driver towards or past a POI, such as a store or stop that is frequented by other users (e.g., drivers) traversing a similar path.

Additionally or alternatively, the route recommendations may be based on path patterns included in the trajectory data of the particular user and, thus, suggest paths that take the particular user near POIs that the particular user regularly visits (e.g., a grocery store on the way home from work). Consequently, a route may be generated (and recommended) for the particular user that allows the particular user to complete tasks or errands along his or her route and/or visit a popular POI.

In some of these present invention embodiments, the designated location is a current location determined by a GPS receiver of a mobile device and the route recommendations are transmitted to the mobile device for presentation on a map that is shown on a display of the mobile device. Consequently, the route-generation may guide a driver along the recommended route. In fact, in some embodiments, the map may update in real-time and adjust routes for a driver accordingly.

According to other present invention embodiments, generating the route recommendations includes prioritizing the route recommendations based on a user profile for the particular user and predetermined fixed criteria. In at least some of these embodiments, the fixed criteria includes at least one criteria selected from the group of driving time, distance, maximum highway driving, and minimum highway driving. Additionally or alternatively, the user profile may include places of interest visited by the particular user that are determined based on a frequency with which the particular user visits a location associated with the places of interest in trajectory data accumulated for the particular user. For example, if a user regularly visits a particular dry cleaner or grocery store, the user profile may denote the location of the dry cleaner or the grocery store as a place of interest. Generating the route recommendations based on a user profile will serve to increase the efficiency and accuracy of the route recommendations while also personalizing the route recommendations.

According to yet another present invention embodiment, at least the origin and the destination of each data entry may be masked. In some of these embodiments, the masking expands the origin and the destination from precise geographic locations to geographic areas. Masking ensures that the trajectory data of each individual user cannot be identified and preserves privacy of an individual's trajectory data. Moreover, expanding the geographic data associated with an individual ensures that the exact origins and destinations associated with an individual are not available, providing another layer of privacy.

According to still another present invention embodiment, identifying data entries as relevant further includes iteratively expanding at least one of a first geographic area covered by the designated location and a second geographic area covered by the particular destination to identify one or more of the data entries as relevant to the request for the route when an insufficient amount of the data entries are identified as relevant. Consequently, less similar routes are gradually identified as relevant when an initial analysis does not find a match. For example, if a route from a particular neighborhood to a particular office park cannot be found, the latitude and longitude of the neighborhood may be gradually expanded until a route from the covered area to the office park is found (and, thus, identified as relevant).

BRIEF DESCRIPTION OF THE DRAWINGS

Generally, like reference numerals in the various figures are utilized to designate like components.

FIGS. 6 and 7 depict sample data used to determine relevance or similarity, according to a present invention embodiment.

DETAILED DESCRIPTION

Presented herein are techniques for generating navigational routes based on aggregated path data. Path data is aggregated from a number of users (e.g., drivers) and indicates an origin and a destination for a particular route or path. Then, when a particular user requests a navigational route, the route may be determined based on similar paths between the origin and destination associated with the request. That is, the route recommendations provided by the techniques presented herein may provide personalized route recommendations based on routes taken by other drivers between similar origins and destinations. As an example, if a driver requests a route from his office to his home, a route recommendation generated in accordance with the techniques presented herein may consider previous routes taken by other drivers who work and live near this driver. If multiple drivers had taken a particular path and stopped at a certain point of interest during the drive, this may also be taken into consideration. That is, the route recommendations may suggest paths that pass by or near places of interest (for the particular driver or drivers who regularly traverse similar paths), instead of merely suggesting paths based on fixed criteria, such as shortest time or shortest distance.

Among other advantages, the techniques presented herein for generating route recommendations based on aggregated path data allow for more personalized and relevant route recommendations (e.g., relevant to a particular area since the recommendations are based on other users in the area). The techniques also may provide enhanced place of interest (POI) recommendations since frequently used paths will frequent POIs of interest. The techniques presented herein may be largely directed to automotive navigations; however, the advantages provided by these techniques may prove useful for any type of transportation, including walking, public transportation, biking, etc., and, in some embodiments, the similarities between routes (which are discussed in detail below) may be determined based on the type of transportation.

Figure 1:
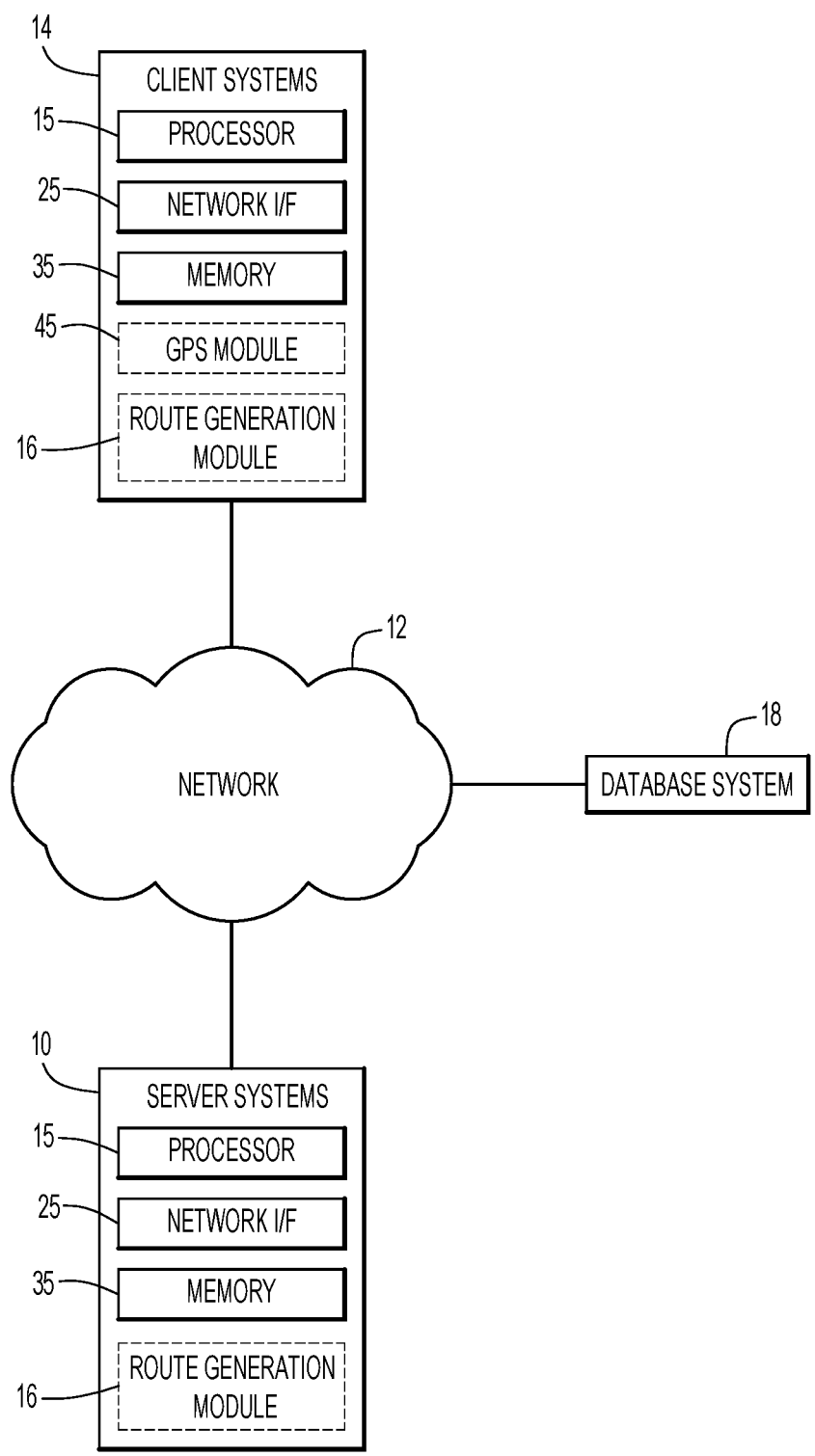
FIG. 1 illustrates an example environment in which the present general inventive concept can be embodied.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

In the present invention embodiment depicted in FIG. 1, the server systems include a route generation module 16 to generate routes based on various inputs, such as the current location of a client system 14. However, in other embodiments, the route generation module 16 may also be disposed, either entirely or partially, on the client systems 14. For example, in some present invention embodiments, request for routes between two locations (an origin and a destination) may be received by a server or client system (e.g., shortest route) and transferred to server systems 10 in order to generate a route recommendation based on aggregated path data. Then, the route recommendations may be transmitted to the server or client system for display. However, in other present invention embodiments, the entire process (e.g., receiving a request, generating a route, and displaying the recommendation) may be completed entirely on the client systems 14 or the server systems 10.

Client systems 14 may be or include a navigation system that can locate the current position of the client system 14, generate travel routes between a starting point and at least one destination, and display the travel routes. Accordingly, the client system 14 may include or have access to a global positioning system (GPS) module 45 that may determine the current position of the client system 14. In some present invention embodiments, the client system 14 may comprise a portable electronic device (e.g., a smart phone) or computer (e.g., an automobile computer) and may utilize a GPS module 45. However, in other embodiments, the client system 14 may be a stand-alone device configured to provide any necessary navigation services described herein (e.g., a wristwatch, handheld or portable electronic device, etc.) and may include its own GPS module 45. Still further, the client system 14 may be a computer system with a browser to access web-based navigation services.

Additionally or alternatively, the client system 14 may be or include an Internet of Thing (IoT) sensor configured to collect and/or transmit trajectory data. For example, the client system may be or include a vehicle sensor that transmits telemetry data to the server systems 10 so that the server systems 10 can determine (and collect or aggregate) path data of the vehicle.

A database system 18 may store various information for the analysis performed by the route generation module 16 (e.g., aggregated path data, user preferences, places of interest, etc.). The database system 18 may be implemented by any conventional or other system, such as a database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems 14 may present a graphical user (e.g., GUI, etc.) or other interface (e.g., command line prompts, menu screens, etc.) to solicit information from users pertaining to the desired information, routes, and analysis, and may provide feedback including analysis results (e.g., a ranking of candidate routes, updates on the risk of particular or current route, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a touch screen display, a keyboard, a mouse, or other input device), and any commercially available and custom software (e.g., server/communications software, route generation module 16, browser/interface software, etc.).

Route generation module 16 may include one or more modules or units to perform the various functions of present invention embodiments described below. Moreover, route generation module 16 may be implemented by any combination of any quantity of software and/or hardware modules or units, and may reside within memory 35 of the server and/or client systems for execution by processor 15. Further description of embodiments of the route generation module 16 is provided in further detail below.

Figure 2:
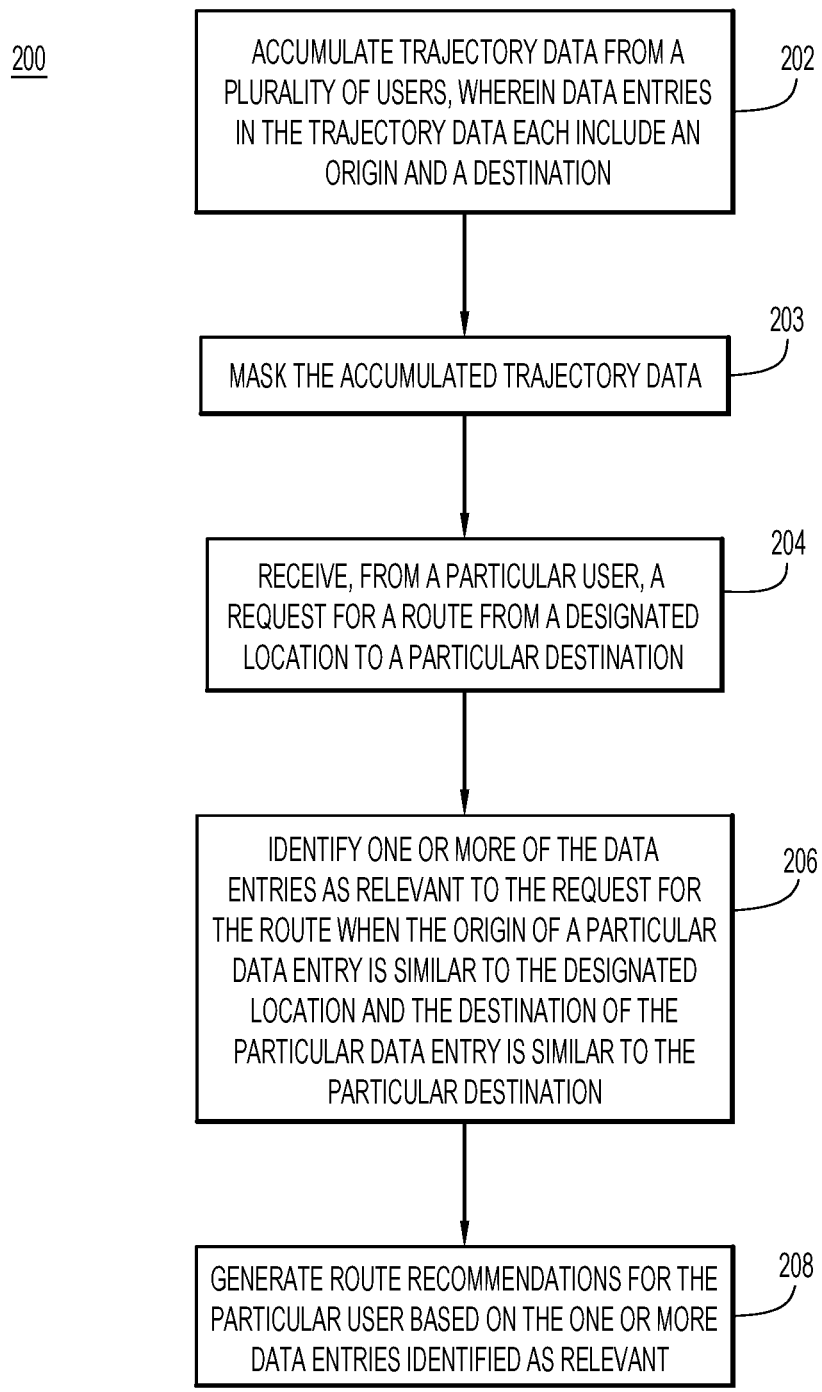
FIG. 2 is a procedural flow chart of generating routes based on aggregated path data, according to a present invention embodiment.
Figure 4:
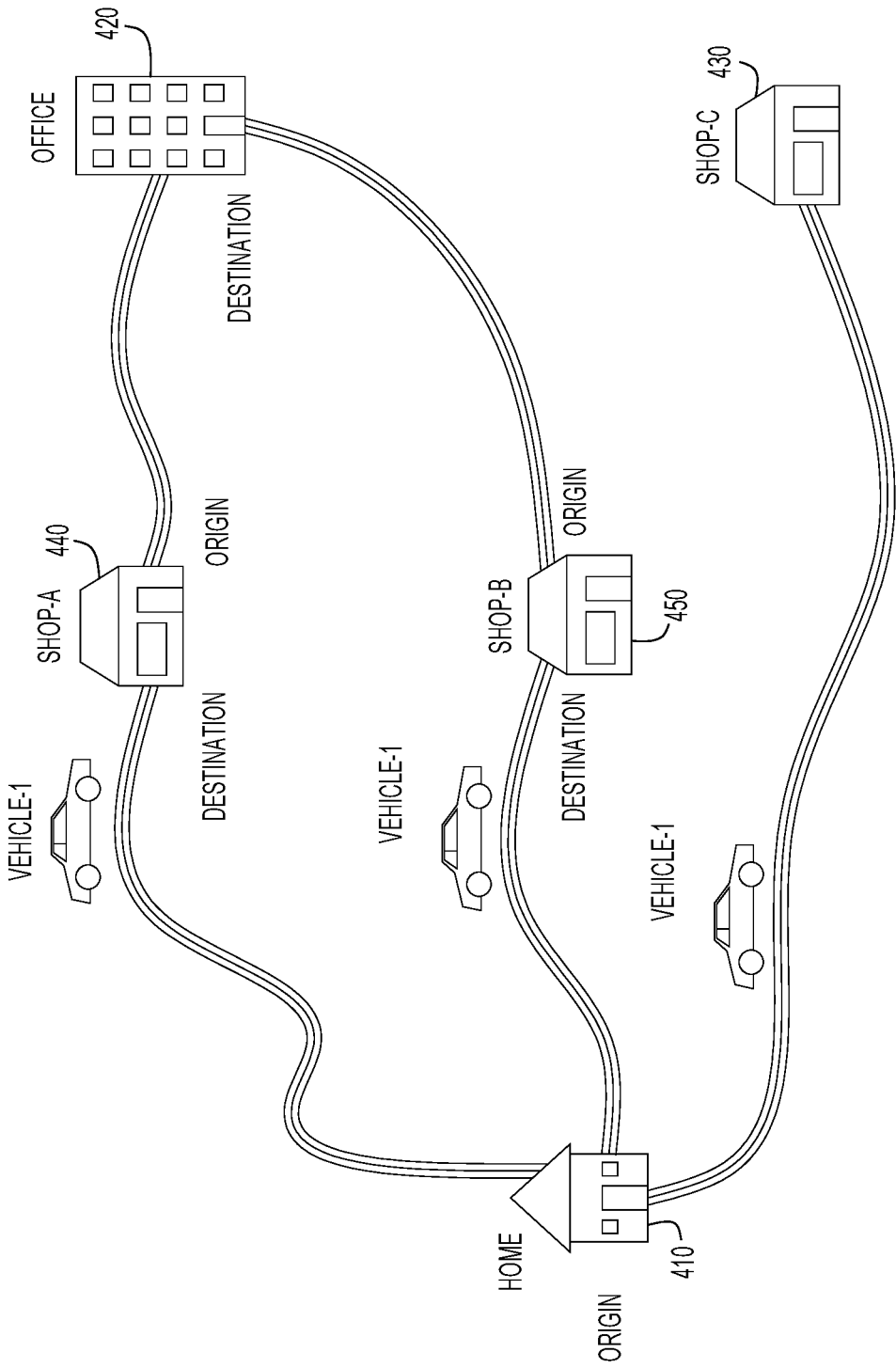
FIG. 4 depicts sample data used to determine path patterns in aggregated trajectory data, according to a present invention embodiment.

With reference now to FIG. 2, procedural flow chart 200 depicts operations (e.g., of route generation module 16) for generating routes. At step 202, trajectory data from a plurality of users is accumulated. Each data entry in the trajectory data represents a route and, thus, includes an origin and a destination. More specifically, each data entry represents a pattern of movement from an origin to a destination. The trajectory data also includes or is associated with data for places of interest, such as restaurants, shopping malls, gas stations, parks, etc. FIG. 4 illustrates an example of trajectory data that is accumulated for a particular vehicle (e.g., based on tracking an IOT sensor included in vehicle 1).

In FIG. 4, vehicle 1 regularly travels between a home location 410 and an office location 420. Vehicle 1 also travels between home location 410 and a location 430 of Shop C. The trips to Shop C (e.g., a grocery store) are typically direct, but the trips to the office location 420 typically include a stop at a location 440 of shop A or a location 450 of shop B. Consequently, the trajectory data for vehicle 1 may reveal at least three route patterns originating at the home location 410 (e.g., Home to Office by way of Shop A, Home to Office by way of Shop B, and Home to Shop C), and up to five route patterns if the trips to the Shop A and Shop B are considered separately from the trips to the Office. Regardless of how the routes are categorized, FIG. 4 illustrates how the trajectory data for one particular user may be accumulated to collect route patterns and learn POIs.

Now referring back to FIG. 2, in order to ensure anonymity of the users from which trajectory is collected, the trajectory data may be masked, at step 203, as or after the data is accumulated. In some embodiments, the masking merely obscures the data (e.g., via hashing). Additionally or alternatively, the geographic coordinates of the accumulated trajectory may be expanded to cover geographic areas, instead of specific addresses or geographic points. For example, an origin at a particular latitude and longitude may be masked by expanding the latitude and longitude to cover a range that includes the particular latitude and longitude. Put another way, the masking may expand the origin and the destination from precise geographic locations to geographic areas. An example of expanding the origin and destination for masking is illustrated in FIG. 5.

Figure 5:
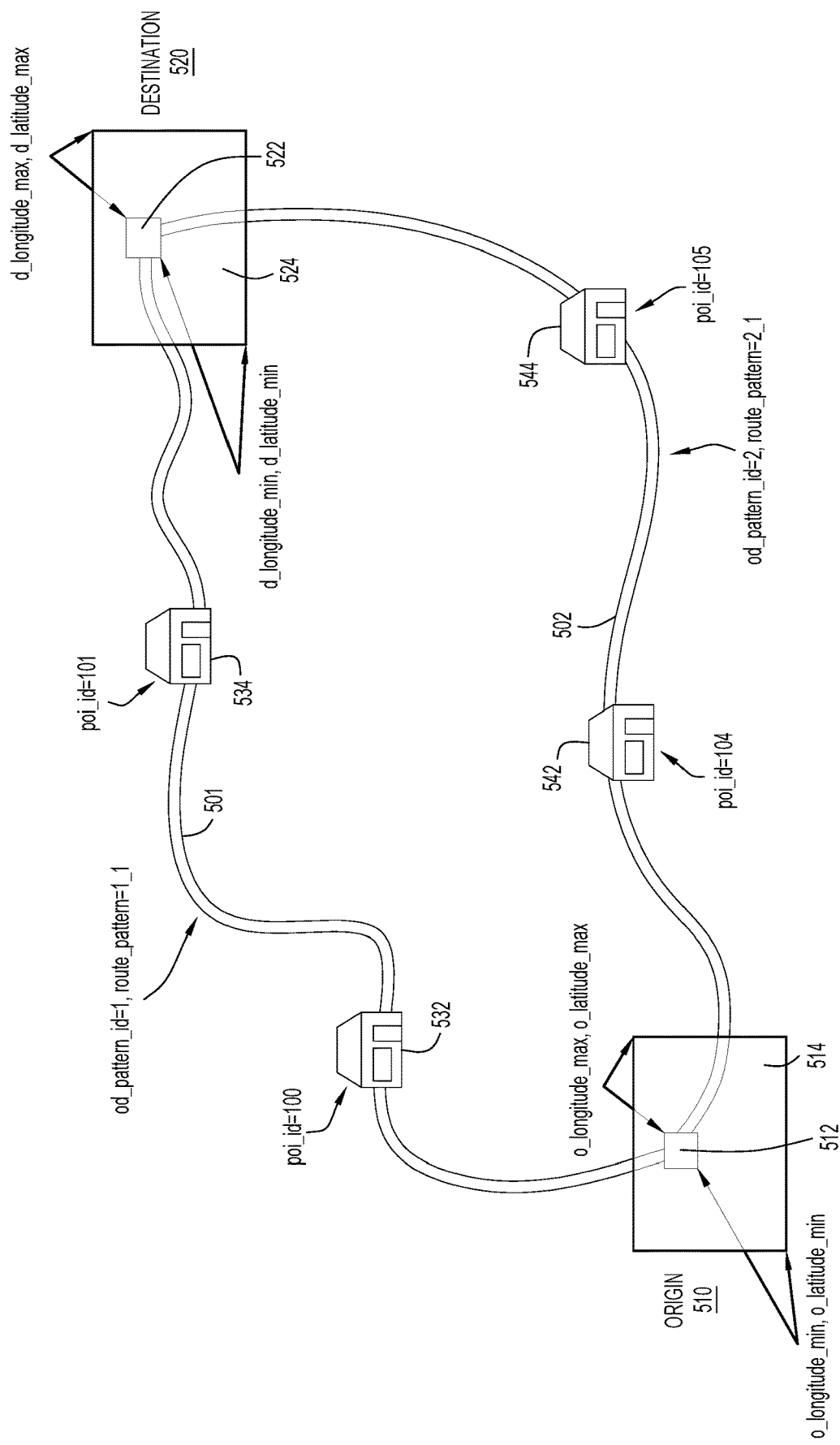
FIG. 5 depicts masking of trajectory data, according to a present invention embodiment.

In FIG. 5, two routes (route 501 and 502) from an origin 510 to a destination 520 are illustrated as examples. Route 501 passes proximate POI 532 and POI 534 while route 502 passes proximate POI 542 and POI 544; however, these are merely included as examples. In order to protect any personal information associated with these routes, the origin 510 and destination 520 are both masked to hide the exact coordinates of the origin and the destination. Specifically, the origin 510 is expanded from geographic region 512 to geographic region 514 while the destination 520 is expanded from geographic region 522 to geographic region 524. In this particular embodiment, the expansion is effectuated by expanding the latitude and longitude of the origin 510 and destination 520 to minimums and maximums (as shown by the increase of d_longitude_min and d_longitude_max and the increase of o_longitude_min and o_longitude_max). Meanwhile, routes 501 and 502, as well as the POIs included along routes 501 and 502, can be assigned ID numbers in order to mask any personal information included therein (e.g., POI 542 is assigned poi_id 104, POI 534 is assigned poi_id 101, route 504 is assigned od_pattern_id 1 and route_pattern 1_1, etc.).

Now referring back to FIG. 2, at step 204, a request is received from a particular user for a route from a designated location to a particular destination. The destination may be a POI, street address, intersection, or any other geographical location and may be input in any desirable manner. For example, in some present invention embodiments a destination may be received as a street address while in other present invention embodiments a destination may be received when a location on a displayed map is touched or otherwise contacted. In still further present invention embodiments, a user may perform a keyword search for a destination (e.g., a POI) and select a destination from search results.

Moreover, in at least some present invention embodiments, the designated location (e.g., the origin) may be an input location or the current location of the user. When routes are generated from the current location of the client system 14 to the destination, the GPS module 45 included in the client system may be utilized to determine a current location. If, on the other hand, the user wants to designate a location other than the current location as the designated location (e.g., origin), the user may select the designated located in the same manner as the destination (e.g., any desirable manner). This may allow a user to plot and consider routes between a non-current location and a destination. For example, if a user is currently at home but wants to consider possible routes between his or her office and a local stadium for that night, the user may input their office address as the designated location (e.g., origin) and the stadium as the destination.

Once a designated location (e.g., an origin or starting location) and a destination (e.g., an endpoint or ending location) are received or determined, accumulated trajectory (e.g., from step 202) may be analyzed, at step 206, to identify one or more data entries as relevant to the requested route. A data entry in the accumulated trajectory data is considered relevant when the data entry includes an origin and destination that are similar to the origin (e.g., the designated location) and the destination of the requested route. For example, if a user lives at 12 Main Street and works at 1 Office Park, routes from adjacent blocks of Main Street (e.g., 1 Main Street to 1200 Main Street) to 1 Office Park may be considered relevant (e.g., if a neighbor works in the same office location). Alternatively, the latitude and longitude of the origin and destination may be compared to the latitude and longitude of data entries in the accumulated trajectory, as is explained in more detail below.

In some instances, the routes in the accumulated trajectory may not be similar to the requested route. That is, the origins and destinations of the routes in the accumulated trajectory may not be close to the designated origin and designated destination for the requested route. In these instances, the route generation module 16 may iteratively expand the geographic area of the designated origin and/or the designated destination until relevant routes are found.

As an example, consider a scenario where User 1 requests a route from his home, at location 1 (with latitude X1 and longitude Y1), to his work, at location 2 (with latitude X2 and longitude Y2). If, after an initial analysis, no data entries are determined to be relevant to this route request, the geographic coordinates of the origin and destination may be iteratively expanded to identify relevant routes. That is, if none of the data entries (e.g., routes) in the accumulated trajectory include an origin at location 1 and a destination of location 2, the geographic area associated with location 1 and location 2 may be iteratively expanded. For example, latitudes X1 and X2 as well as longitudes Y1 and Y2 may be iteratively expanded by 0.1 degrees so that after a first iteration the origin cover a range of X1±0.1 degrees and Y1±0.1 degrees while the destination covers a range of X2±0.1 degrees and Y1±0.1 degrees. The latitudes and longitudes may be iteratively expanded in this manner until relevant routes are discovered (e.g., identified).

On the other hand, in some instances, many routes may identified as relevant to the requested route. When multiple routes (e.g., data entries) in the accumulated trajectory data are identified as relevant, the relevant routes may be prioritized based on a user or driver profile of the user requesting the route. For example, in the scenario above, if the accumulated trajectory includes multiple data entries (e.g., routes) from location 1 to location 2, these routes may be identified as relevant. Then, these routes may be prioritized (e.g., for recommendation to User 1) based on a driver profile for User 1. The profile may include indications of preferences between fixed criteria and/or user preferences determined based on trajectory data accumulated for the user associated with the profile.

Generally, the fixed criteria may include a variety of traditional navigation methods that consider fixed inputs such as distance, speed limits, number of turns, traffic lights, etc. For example, routes may be determined based on the shortest distance between a designated location and a destination, the shortest amount of driving time between a designated location and a destination or the minimal amount of highway driving required between a designated location and a destination. Thus, if, for example, the driver profile indicates that User 1 prefers highway driving (which may be input by User 1 or determined based on an analysis of accumulated trajectory data for User 1), the relevant routes with the most highway driving may prioritized. Additionally or alternatively, if the driver profile for User 1 indicates a preference or pattern of visiting a POI, such as User 1 visiting a place of interest (e.g., a grocery store, gas station, laundromat, etc.) on a certain day of the week, a route that passes the place of interest may be prioritized, especially on that day of the week.

At step 208, candidate routes may be generated as route recommendations for the particular user requesting the route. The candidate routes from the designated location to the destination are determined based on available roadways (e.g., any roads in the area that are open to the public for transportation) and the relevant routes identified in step 206. In at least some instances, the relevant data entries include accumulated trajectory data for the particular driver. Consequently, if a user has regularly traveled between the designated location and the particular destination, the user's trajectory patterns may be considered together with aggregated data from other users (e.g., drivers).

In at least some embodiments, the path data for a particular driver may be utilized to review a route recommendations generated in view of path data from other users. For example, initially a route recommendation may be generated based on relevant paths from other users. Then, if there is a difference between the user's typical route (as determined from trajectory data accumulated for the user) and the routes identified as relevant (e.g., at step 206), the route recommendation may be at least partially adjusted to compensate for the difference. Put another way, the generated path recommendations may update dynamically based on input from a GPS sensor of the user requesting a route.

Additionally or alternatively, the route recommendations may update dynamically based on input from GPS sensors associated with any of the plurality of users from which trajectory data is aggregated. For example, on a first day, the techniques presented herein may recommend a first route from a first location to a second location based on the most recent trajectory data aggregated from GPS sensors. However, on a second day (sometime after the first day), the techniques presented herein may recommend a second route from the first location to the second location based on trajectory data aggregated from GPS sensors between the first day and second day. This may provide updated and improved route recommendations (e.g., for a GPS module).

Additionally or alternatively, the route recommendations may dynamically update route recommendations based on time of day, day of week, month, weather, traffic, or any other factor that may impact the relevance of a POI or the route of an individual. As a concrete example, an ice cream shop may only be considered a relevant POI during warm weather or summer months. Similarly, if a driver visits the grocery store on his way home from work every Tuesday or many users visit a restaurant on Monday for the half-price special, the route recommendations may be adjusted accordingly (e.g., the driver profile may indicate a tendency for visiting a grocery store when recommending a route for Tuesday and the route recommendations may focus on the restaurant with the special on Monday).

In at least some embodiments, the route recommendations generated at step 208 are displayed on a map, such as a real-time map. For example, the route recommendations may be listed in a table or chart and ordered based, at least in part, a priority assigned to the route recommendation. Additionally or alternatively, the routes may be displayed on or over the roads of a real-time map one at a time (with the other routes hidden or grayed out) based, at least in part, a priority assigned to the route recommendation. Still further, all of the candidate routes may be shown on or over the roads of a real-time map, with priorities indicated on the route recommendations. For example, each route may be color-coded (either the entire route or portions of each route) to indicate a priority of the recommendation. In order effectuate a display, the route recommendations may be generated locally at a device with a display (e.g., a mobile device, such as a smartphone) or generated remotely and transmitted to the device for display.

Figure 3:
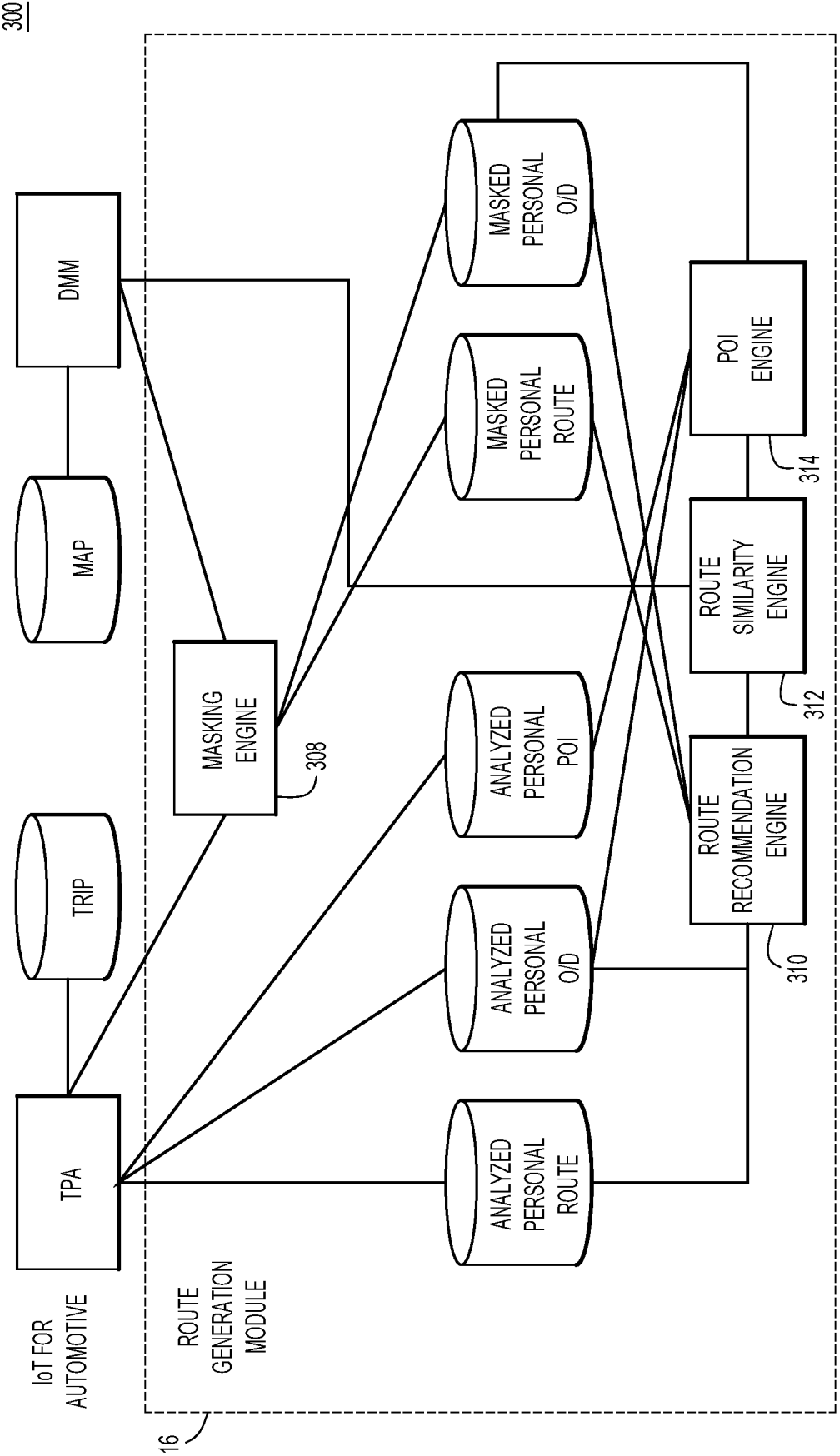
FIG. 3 is a block diagram depicting route generation based on aggregated path data, according to a present invention embodiment.

FIG. 3 is a block diagram 300 depicting route generation operations based on contextual risk, according to one present invention embodiment. As shown, according to at least one present invention embodiment, the route generation module 16 may include a masking engine 308, a route recommendation engine 310, a route similarity engine 312, and a POI engine 314. Together, these components can accumulate and mask trajectory data, identify trajectory data that is relevant to a requested route, and generate route recommendations based on the accumulated data in the manner described above with respect to FIG. 2.

More specifically, in the depicted embodiment, the masking engine 308 may aggregate data from a trajectory pattern analysis (TPA) module or engine and a dynamic map manager (DMM). Collectively, these two sources may allow the masking engine to aggregate path data and path patterns for a plurality of users. The map data may also enable path data to be associated with geographic areas or points and provide geographic coordinates for routes and POIs. The masking engine may 308 masks all of this data to ensure the anonymity is provided to any users from whom data is collected.

Meanwhile, the route similarity engine 312 is configured to calculate which routes in the aggregated path data have similar origins and destinations. In one particular embodiment, this is accomplished by searching a list of od_pattern_id from a "Masked Personal O/D" table by filtering the distance from the origin and destination of the requested route. Specifically a set of rules can be applied to the aggregated path data that can be summarized as: if(diff (o_longitude_min)<threshold; diff (o_longitude_max) <threshold; diff (o_latitude_max)<threshold; and diff (o_latitude_min)<threshold), then the path pattern has a similar origin and destination to the requested route and the path pattern can be marked as relevant.

The route recommendation engine 310 is configured to recommend routes to the particular user requesting a route. The route recommendation engine 310 may make these recommendations by using the relevant routes (from the route similarity engine 312) to identify POIs (e.g., from "Analyzed Personal POI" table) associated with the relevant routes. These POIs can then be filtered based on user preferences or tendencies included in the driver profile of the particular user requesting the route. In some embodiments, the routes identified as similar can even be filtered based on the POIs included thereon or nearby and whether they match the preference preferences or tendencies included in the driver profile.

In some embodiments, the route generation module 16 may also recommend POIs separately (e.g., independently) from a route recommendation or in conjunction with a route recommendation (e.g., to determine if a route might be desirable to a user based on a POI). Consequently, in at least some embodiments, the route generation module 16 may also include a POI engine 314 configured to recommend POIs. The POI engine 312 may use the relevant routes identified by the route similarity engine 312 to identify relevant POIs included along relevant routes (e.g., from "Masked Personal Route" table). Then, these POIs may be filtered based on the driver profile of the user requesting the route. When multiple POIs are included in the filtering, the similarity between the POI and the preferences indicated in the driver profile of the user requesting the route may be determined. Then, the POIs may be prioritized based on comparing drivers' profile and type of POI (supermarket, cafe, restaurant, etc.).

Figure 6:
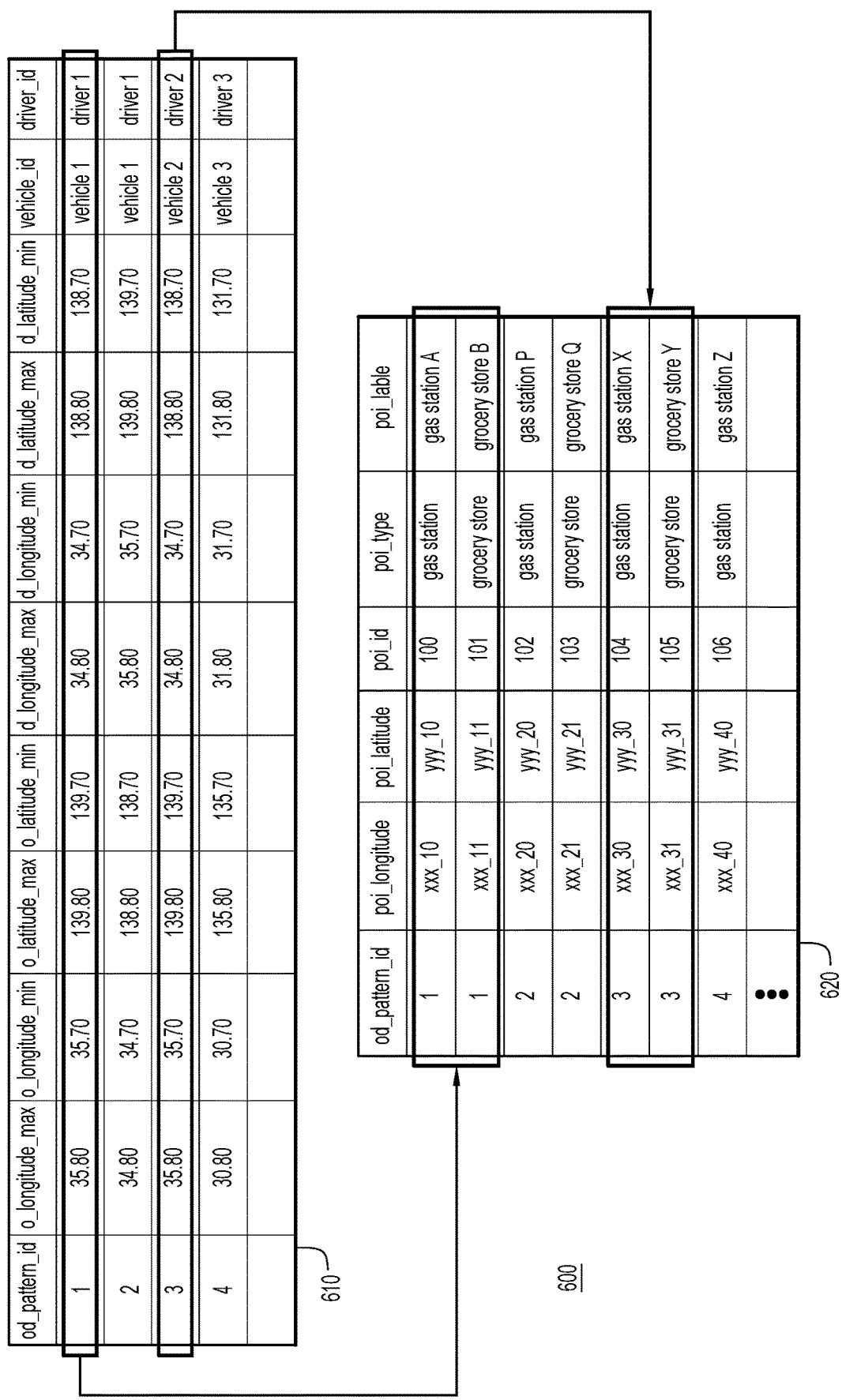

In FIGS. 6 and 7, diagrams 600 and 700 illustrate example data associated with the techniques presented herein. In diagram 600, table 610 illustrates masked path data aggregated from three drivers (indicated in column driver_id). Two paths are associated with Driver 1 while one path is associated with each of Driver 2 and Driver 3. Each path includes an origin that is represented by a geographic area extending between a maximum longitude (o_longitude_max), a minimum longitude (o_longitude_min), a maximum latitude (o_latitude_max), and a minimum latitude (o_latitude_min). Each path also includes a destination that is represented by a geographic area extending between a maximum longitude (d_longitude_max), a minimum longitude (d_longitude_min), a maximum latitude (d_latitude_max), and a minimum latitude (d_latitude_min). As mentioned above, the maximum and minimum latitudes and longitudes mask the true origin and destination of the paths, thereby protecting personal information (such as a home address).

Meanwhile, table 620 illustrates places of interest that are included along each path. As can be seen, each of path 1, path 2 and path 3 include two POIs, while path 4 includes a single POI. Again, to protect personal information, the POIs are masked; however, now, the information is masked by assigning identifiers to each POI and identifying the POIs with certain types (e.g., gas station or grocery store). As is discussed above, the techniques presented herein can identify similarities between the different paths based on the data included therein. For example, in tables 610 and 620, path 1 is identified as similar to path 2 because the origin and destination are identical.

Diagram 700 includes a table 702 that illustrates masked data of the paths. This data may provide an indication of the path between the origin and destination and may be used to suggest path recommendations to a user requesting a route (e.g., once a path from aggregated data is determined to be relevant to the requested route).

It will be appreciated that the embodiments described above and illustrated in the drawings represent only a few of the many ways of implementing embodiments for generating routes based on contextual risk.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, route generation module, etc.). These systems may include any types of monitors and input devices (e.g., keyboard, mouse, voice recognition, etc.) to enter and/or view information. The communication with drivers would be both visual and audio so that drivers do not have to focus their attention on the navigational risk screen.

It is to be understood that the software (e.g., route generation module 16) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., route generation module 16) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., masked route data, driver profiles, etc.). The database system may be implemented by any number of any conventional or other databases, data stores or storage structures (e.g., files, databases, data structures, data or other repositories, etc.) to store information (e.g., masked route data, driver profiles, etc.). The database system may be included within or coupled to the server and/or client systems. The database systems and/or storage structures may be remote from or local to the computer or other processing systems, and may store any desired data (e.g., masked route data, driver profiles, etc.).

The present invention embodiments may employ any number of any type of user interface (e.g., Graphical User Interface (GUI), command-line, prompt, etc.) for obtaining or providing information (e.g., a destination, origin, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touchscreen, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating navigational route recommendations, comprising:
    accumulating trajectory data from a plurality of users corresponding to paths traversed by the plurality of users between an origin and a destination, wherein data entries in the trajectory data include the origin, the destination, and one or more places of interest along a corresponding path visited by a corresponding user;
    receiving, from a particular user, a request for a route from a designated location to a particular destination;
    identifying one or more of the data entries of other users as relevant to the request for the route by comparing the origin and the destination of the data entries to the designated location and the particular destination of the request for the route;
    in response to a lack of data entries identified as relevant to the request, expanding at least one of a first geographic area corresponding to the designated location and a second geographic area corresponding to the particular destination until one or more of the data entries are identified as relevant;
    generating route recommendations for the particular user based on the one or more data entries identified as relevant, wherein the route recommendations include corresponding paths of the relevant data entries; and
    prioritizing the route recommendations based on the route recommendations satisfying a user profile of the particular user, wherein the user profile indicates one or more types of places of interest and a corresponding time for visiting those places of interest.

2. The method of claim 1, wherein the designated location is a current location determined by a global positioning system (GPS) receiver of a mobile device and the method further comprises:
    transmitting the route recommendations to the mobile device for presentation on a map that is shown on a display of the mobile device.

3. The method of claim 1, wherein the prioritizing further comprises:
    prioritizing the route recommendations based on the user profile for the particular user and predetermined fixed criteria.

4. The method of claim 3, wherein the fixed criteria include at least one selected from a group consisting of driving time, distance of a route recommendation, maximum amount of time or distance of a route recommendation being on a highway, and minimum amount of time or distance of a route recommendation being on a highway.

5. The method of claim 3, wherein the user profile includes places of interest visited by the particular user, and the method further comprises:
    determining the places of interest visited by the particular user based on a frequency with which the particular user visits a location associated with the places of interest in trajectory data accumulated for the particular user.

6. The method of claim 1, further comprising:
masking at least the origin and the destination of each data entry.

7. The method of claim 6, wherein the masking expands the origin and the destination from precise geographic locations to geographic areas.

8. A navigation system comprising:
a network interface unit;
a processor configured to:
accumulate trajectory data from a plurality of users corresponding to paths traversed by the plurality of users between an origin and a destination, wherein data entries in the trajectory data include the origin, the destination, and one or more places of interest along a corresponding path visited by a corresponding user;
receive, from a particular user, a request for a route from a designated location to a particular destination;
identify one or more of the data entries of other users as relevant to the request for the route by comparing the origin and the destination of the data entries to the designated location and the particular destination of the request for the route;
in response to a lack of data entries identified as relevant to the request, expand at least one of a first geographic area corresponding to the designated location and a second geographic area corresponding to the particular destination until one or more of the data entries are identified as relevant;
generate route recommendations for the particular user based on the one or more data entries identified as relevant, wherein the route recommendations include corresponding paths of the relevant data entries; and
prioritize the route recommendations based on the route recommendations satisfying a user profile of the particular user, wherein the user profile indicates one or more types of places of interest and a corresponding time for visiting those places of interest.

9. The navigation system of claim 8, wherein the designated location is a current location determined by a global positioning system (GPS) receiver of a mobile device and the processor is further configured to:
transmit the route recommendations to the mobile device for presentation on a map that is shown on a display of the mobile device.

10. The navigation system of claim 8, wherein in prioritizing the route recommendations, the processor is further configured to:
prioritize the route recommendations based on the user profile for the particular user and predetermined fixed criteria that include at least one selected from a group consisting of driving time, distance of a route recommendation, maximum amount of time or distance of a route recommendation being on a highway, and minimum amount of time or distance of a route recommendation being on a highway.

11. The navigation system of claim 10, wherein the user profile includes places of interest visited by the particular user, and the processor is further configured to:
determine the places of interest visited by the particular user based on a frequency with which the particular user visits a location associated with the places of interest in trajectory data accumulated for the particular user.

12. The navigation system of claim 8, wherein the processor is further configured to:
mask at least the origin and the destination of each data entry, at least by expanding the origin and the destination from precise geographic locations to geographic areas.

13. A computer program product for generating navigational route recommendations, the computer program product comprising one or more non-transitory computer readable storage media collectively having program instructions embodied therewith, the program instructions executable by a processor to cause the processor to:
accumulate trajectory data from a plurality of users corresponding to paths traversed by the plurality of users between an origin and a destination, wherein data entries in the trajectory data include the origin, the destination, and one or more places of interest along a corresponding path visited by a corresponding user;
receive, from a particular user, a request for a route from a designated location to a particular destination;
identify one or more of the data entries of other users as relevant to the request for the route by comparing the origin and the destination of the data entries to the designated location and the particular destination of the request for the route;
in response to a lack of data entries identified as relevant to the request, expand at least one of a first geographic area corresponding to the designated location and a second geographic area corresponding to the particular destination until one or more of the data entries are identified as relevant;
generate route recommendations for the particular user based on the one or more data entries identified as relevant, wherein the route recommendations include corresponding paths of the relevant data entries; and
prioritize the route recommendations based on the route recommendations satisfying a user profile of the particular user, wherein the user profile indicates one or more types of places of interest and a corresponding time for visiting those places of interest.

14. The computer program product of claim 13, wherein the designated location is a current location determined by a global positioning system (GPS) receiver of a mobile device and the program instructions are further executable to cause the processor to:
transmit the route recommendations to the mobile device for presentation on a map that is shown on a display of the mobile device.

15. The computer program product of claim 13, wherein the program instructions executable to cause the processor to prioritize the route recommendations further comprise instructions executable by the processor to cause the processor to:
prioritize the route recommendations based on the user profile for the particular user and predetermined fixed criteria that include at least one selected from a group consisting of driving time, distance of a route recommendation, maximum amount of time or distance of a route recommendation being on a highway, and minimum amount of time or distance of a route recommendation being on a highway.

16. The computer program product of claim 15, wherein the user profile includes places of interest visited by the particular user, and the program instructions are further executable to cause the processor to:
- determine the places of interest visited by the particular user based on a frequency with which the particular user visits a location associated with the places of interest in trajectory data accumulated for the particular user.

17. The computer program product of claim 13, wherein the program instructions are further executable to cause the processor to:
- mask at least the origin and the destination of each data entry, at least by expanding the origin and the destination from precise geographic locations to geographic areas.

* * * * *